United States Patent
Kawano et al.

(10) Patent No.: US 7,063,914 B2
(45) Date of Patent: Jun. 20, 2006

(54) FUEL CELL SEPARATOR, PROCESS FOR PRODUCING THE SAME AND MATERIAL THEREFOR

(75) Inventors: Yoichi Kawano, Fukuoka (JP); Takayuki Kawarada, Fukuoka (JP); Hiroshi Ono, Fukuoka (JP)

(73) Assignee: Nippon Steel Chemical Co., Ltd. (JP)

( * ) Notice: Subject to any disclaimer, the term of this patent is extended or adjusted under 35 U.S.C. 154(b) by 238 days.

(21) Appl. No.: 10/343,976

(22) PCT Filed: Sep. 3, 2001

(86) PCT No.: PCT/JP01/07597

§ 371 (c)(1),
(2), (4) Date: Feb. 6, 2003

(87) PCT Pub. No.: WO02/21620

PCT Pub. Date: Mar. 14, 2002

(65) Prior Publication Data

US 2003/0175571 A1    Sep. 18, 2003

(30) Foreign Application Priority Data

Sep. 4, 2000 (JP) ............... 2000-267447
Sep. 7, 2000 (JP) ............... 2000-272061
Sep. 7, 2000 (JP) ............... 2000-272062

(51) Int. Cl.
*H01M 4/96* (2006.01)

(52) U.S. Cl. ......................... 429/44; 429/34

(58) Field of Classification Search ............ 429/34, 429/44

See application file for complete search history.

(56) References Cited

U.S. PATENT DOCUMENTS 5,641,840 A * 6/1997 Tsuchida et al. ............ 525/481
6,824,874 B1 * 11/2004 Shah et al. .................. 428/413
2002/0107318 A1 * 8/2002 Yamada et al. ............. 524/495

FOREIGN PATENT DOCUMENTS

JP    08-031231 A1    2/1996

(Continued)

OTHER PUBLICATIONS

International Search Report of PCT/JP01/07597 mailed on Dec. 4, 2001.

(Continued)

*Primary Examiner*—Dah-Wei Yuan
(74) *Attorney, Agent, or Firm*—Rader, Fishman & Grauer PLLC

(57) ABSTRACT

This invention relates to a fuel cell separator of excellent electrical conductivity, gas impermeability and strength. The composition for a fuel cell separator of this invention comprises a resin binder with a viscosity of 0.01–0.5 Pa·s at 150° C. and a viscosity of 3 Pa·s or more at 25° C. and graphite particles at a weight ratio of 1:(5–15) and a curing accelerator. The resin binder is exemplified by an epoxy resin binder composed of an epoxy resin and a curing agent for the epoxy resin. The process for producing the fuel cell separator of this invention is practiced by kneading and molding the aforementioned composition for a fuel cell separator and curing above the curing temperature of the composition. The fuel cell separator of this invention to be obtained by the aforementioned process shows a bulk density of 1.90 g/cm$^3$ or more, a sheet resistance (areal pressure, 0.5 MPa) of 40 mΩcm$^2$ or less, a gas permeability of 1×10$^{-14}$ cm$^2$ or less and a flexural strength of 30 MPa or more.

15 Claims, 2 Drawing Sheets

Isotropic synthetic graphite : recrystallized graphite

FOREIGN PATENT DOCUMENTS

| | | |
|---|---|---|
| JP | 11-195422 A1 | 7/1999 |
| JP | 2000-021421 A1 | 1/2000 |
| JP | 2000-040517 A1 | 2/2000 |
| JP | 2000-077079 A1 | 3/2000 |
| JP | 2000-100453 A1 | 4/2000 |

OTHER PUBLICATIONS

IB-99-19389-A1 Apr. 22, 1999 Choate et al.
International Preliminary Examination Report for PCT/JP01/07597 mailed on Jul. 7, 2003.

* cited by examiner

FUEL CELL SEPARATOR, PROCESS FOR PRODUCING THE SAME AND MATERIAL THEREFOR

FIELD OF TECHNOLOGY

This invention relates to a fuel cell separator, a process for producing the same and a composition useful for the production of a fuel cell separator.

BACKGROUND TECHNOLOGY

Fuel cells to be mounted on automobiles are attracting public attention. Fuel cells of this type utilize chemical energy directly as electrical energy without converting it to thermal energy and normally generate electricity by the reaction of hydrogen with oxygen. Fuel cells are available in several types such as phosphoric acid fuel cell, solid electrolyte fuel cell and solid polymer fuel cell (PEFC) and separators that are electrically conductive molded articles are used in solid polymer fuel cells and phosphoric acid fuel cells. The separator constitutes a unit cell together with electrodes and the like and, as the unit cells are used in a layered arrangement, the separator is required to keep gases (hydrogen and oxygen) separated from each other on the one hand and to be electrically conductive on the other. For this reason, the separator must meet requirements of a high electrical conductivity of $10 \times 10^{-2}$ Ωcm or less, low gas permeability and good resistance to oxidation, hydrolysis and hot water.

A graphitized carbonaceous material composed of a binder and carbonaceous particles of plural particle sizes is proposed in JP1992-214072 A in order to obtain a carbonaceous material that is dense, mechanically strong, electrically conductive and suitable for a fuel cell separator. This technique, however, requires graphitization after molding. A carbonaceous material formulated from a thermosetting resin, Ketjenblack and spherical graphite particles is proposed in JP1996-31231 A in order to obtain a carbonaceous material suitable for a fuel cell separator that shows a void of 5% or less and, when molded, shows a ratio of the volume resistivity in the XY direction to that in the Z direction of 2 or less. Moreover, in order to reduce the amount of binder and improve the electrical conductivity, a method is proposed in JP1999-195422 A for incorporating a small amount of binder in a carbonaceous material, molding the mixture under pressure and impregnating the molded article with an impregnating agent. Still more, a fuel cell separator whose surface roughness is controlled within the specified range to reduce contact resistance to the electrode part is proposed in JP1999-297338 A. The use of synthetic graphite together with natural graphite is proposed in JP2000-40517 A to produce a fuel cell separator with minimal anisotropy. The use of specified graphite particles is proposed in JP2000-21421 A to produce a fuel cell separator that is well-balanced in properties such as gas impermeability, thermal conductivity and electrical conductivity. There is, however, a strong demand for fuel cell separators that show better properties and are better balanced.

DISCLOSURE OF THE INVENTION

An object of this invention is to provide a fuel cell separator which is easy to produce by molding, highly impermeable to gases, mechanically strong, dense and electrically conductive, a process for producing the same and a material therefor.

This invention relates to a composition for a fuel cell separator which is formulated from graphite particles and a liquid or solid resin binder with a viscosity of 0.01–0.5 Pa·s at 150° C. and a viscosity of 3 Pa·s or more at 25° C. at a weight ratio of (5–15):1. An example of the resin binder is an epoxy resin binder composed of an epoxy resin and a curing agent for the epoxy resin. In this case, a curing accelerator is preferably used together with the epoxy resin binder.

The epoxy resin to be used as epoxy resin binder is exemplified by an epoxy resin represented by the following general formula (1),

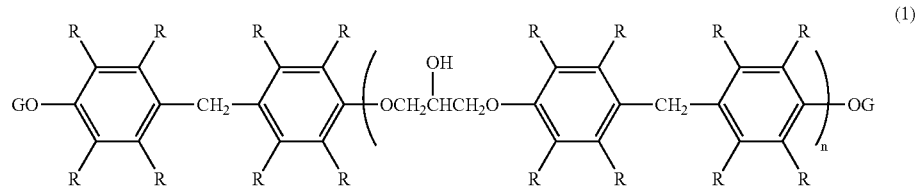

wherein G is glycidyl or methylglycidyl group, R is a hydrogen atom, a halogen atom or a hydrocarbon group containing 1–6 carbon atoms, either identical with or different from one another, and n is a number of 0–15.

An example of graphite particles is a mixture of synthetic graphite particles with an average diameter of 50–300 μm and Kish graphite particles with an average diameter of less than 50 μm at a weight ratio of 40:60 to 90:10.

Moreover, this invention relates to a process for producing a fuel cell separator which comprises kneading the aforementioned composition for a fuel cell separator into a homogeneous composition, grinding the homogeneous composition, molding the ground composition and curing the molded composition.

Still more, this invention relates to a fuel cell separator which is produced by the aforementioned process and shows a bulk density of 1.90 g/cm³ or more and a sheet resistance (areal pressure, 0.5 MPa) including sheets of carbon paper of 40 mΩ cm² or less. It is preferable that a separator for fuel cells shows a flexural strength of 30 MPa or more and a gas permeability of $1 \times 10^{-14}$ cm² or less.

A fuel cell is constructed of plural layers of unit cells and a separator is put between the adjacent unit cells to perform a function of forming flow passages for fuel gas and oxidized gas between the unit cell and the electrode and separating fuel gas and oxidized gas with grooves for passage of gases formed on the separator. The fuel cell separator of this invention is produced by molding graphite particles and a thermosetting resin into an article of the specified shape and curing the molded article and the separator is used in fuel cells as it is or, if necessary, after additional processing to provide grooves or holes. It is to be understood that a fuel cell separator as referred to in this invention includes the components of a fuel cell separator prior to processing.

The composition for a fuel cell separator of this invention comprises graphite particles, a resin binder and a curing accelerator as essential ingredients. The ratio of the graphite particles to the resin binder is 1 part by weight of the epoxy resin binder to 5–15 parts by weight of the graphite particles.

There is no restriction other than high electrical conductivity on the graphite particles to be used in this invention and, for example, at least one kind of the following variety of graphites is used; graphitized carbonaceous materials such as mesocarbon microbeads, graphitized coal- or petroleum-derived cokes, particles obtained by processing graphite electrodes and special carbonaceous materials, natural graphite, Kish graphite and expanded graphite.

The graphite particles to be used in this invention are desirably a mixture of particles showing at least two kinds of particle distributions, that is, large particles with an average diameter of 50–300 μm, preferably 70–150 μm, and small particles with an average diameter of less than 50 μm, preferably 5–20 μm. The weight ratio of large particles to small particles is 40:60 to 90:10, preferably 70:30 to 80:20. The use of two kinds of graphite particles is expected to offer the following advantages. Large particles, when kneaded and ground, generate new coke surfaces which come into contact to form a path for conducting electricity and, because large particles have a small surface area, they can be kneaded even with a small amount of resin. Small particles facilitate mutual contact of graphite particles, raise the strength of molded articles and are effective for raising the bulk density.

It is also desirable that the graphite particles to be used in this invention are a mixture of isotropic graphite particles and anisotropic graphite particles and the weight ratio of the isotropic particles to the anisotropic particles is 40:60 to 90:10, preferably 70:30 to 80:20. It is also desirable that the graphite particles are a mixture of synthetic graphite particles and Kish graphite particles and the weight ratio of the two is 40:60 to 90:10, preferably 70:30 to 80:20. Moreover, a combination of isotropic graphite particles and Kish graphite particles yields good results. The use of two kinds or more of graphite particles produces another effect of raising the bulk density. Isotropic graphite particles are prepared by molding an article by a known method such as CIP molding and HIP molding followed by graphitizing and grinding of the article. Synthetic graphite particles are preferred as isotropic graphite particles while Kish graphite particles are preferred as anisotropic graphite particles.

In the cases where a mixture of the aforementioned graphite particles is used, it is preferable that synthetic graphite particles or isotropic graphite particles are used for large particles and Kish graphite particles or aniosotropic graphite particles are used for small particles. The use of graphite particles differing from each other in properties and average diameter at the aforementioned ratio raises the bulk density and improves electrical conductivity, gas impermeability and strength. Moreover, synthetic graphite particles are somewhat inferior to natural graphite particles in respect to electrical conductivity but less anisotropic than natural graphite particles.

The resin binder to be used in this invention binds graphite particles together to a specified strength and hardens them and it is a solid or a liquid with a viscosity of 0.01–0.5 Pa·s at 150° C. and a viscosity of 3 Pa·s or more at 25° C. A thermoplastic resin such as crystalline polymer may be used as resin binder, but a thermosetting resin is preferred. A variety of thermosetting resins such as phenolic resins and epoxy resins may be used, but epoxy resins are preferred. Some of thermosetting resins require a curing agent and in such a case, the resin binder comprises a thermosetting resin and a curing agent as essential ingredients. An example of a preferable resin binder is an epoxy resin binder comprising an epoxy resin and a curing agent for the epoxy resin.

In the case of an epoxy resin binder, it is preferable that at least a part, preferably 50 wt % or more, more preferably 80 wt % or more, of the epoxy resin to be incorporated in the binder is represented by the aforementioned general formula (1). In formula (1), G is glycidyl or methylglycidyl group, preferably glycidyl group, R is a hydrogen atom, a halogen atom or a hydrocarbon group containing 1–6 carbon atoms, either identical with or different from one another, preferably a hydrogen atom or an alkyl group containing 1–3 carbon atoms, and one benzene ring has 0–4 substituents other than hydrogen. The symbol n is a number of 0–15 and preferably n is in the range of 0–2 as average number of repeating units. The epoxy resin is preferably either a liquid at 25° C. or a solid with a softening point or a melting point of 100° C. or below, preferably 40–90° C.

The epoxy resin to be represented by general formula (1) is preferably a bisphenol F type epoxy resin, that is, an epoxy resin represented by general formula (1) wherein all R's are H or an alkylbisphenol F type epoxy resin represented by the following formula (2).

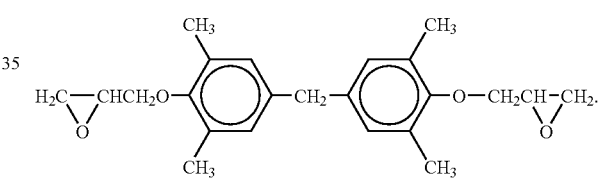

(2)

The epoxy resin represented by the aforementioned general formula (1) can be obtained by the reaction of phenol or a substituted phenol with formalin to give bisphenol F or substituted bisphenol F followed by epoxidation with epichlorohydrin. Substituted phenols include cresol, xylenol, trimethylphenol, tetramethylphenol and chlorophenol.

Curing agents known for epoxy resins are useful here and they include phenols, amines and carboxylic acid derivatives such as phthalic acid and its derivatives, but polyhydric phenols are preferable and novolak-based curing agents obtained from phenol, alkylphenol and formalin are more preferable. As for the novolak-based curing agents, those which soften above normal temperature are advantageous.

The resin binder is easy to handle if it is a liquid or a solid with a viscosity of 0.01–0.5 Pa·s, preferably 0.03–0.4 Pa·s, at 150° C. and a viscosity of 3 Pa·s or more at 25° C. The reason for controlling the viscosity at the aforementioned value at 150° C. is that a small amount of binder can yield a molded article, namely a separator, of high strength, high bulk density and low resistivity. Control of the viscosity like this can be exercised easily by proper selection of the softening point and viscosity of the resin or the resin and curing agent to be used.

The equivalent ratio of epoxy resin to curing agent is not limited to any specific value in the case of an epoxy resin binder, but it is preferably in the range of 0.5–1.5. In this case, a curing accelerator for the epoxy resin is preferably used and any of known accelerators such as amines, imidazoles, phosphines and Lewis acids can be used. The amount of curing accelerator is not specific, but it is preferably in the range of 0.01–10 parts by weight per 100 parts by weight of the epoxy resin binder.

As for the proportion of graphite particles and resin binder, too much or too little of the resin binder increases the resistivity and the graphite particles are preferably used in an amount 5–15 times, preferably 8–12 times, the amount of the resin binder. If the amount of the graphite particles is more than 15 times, the density does not go up sufficiently and the gas impermeability goes down. If the amount is less than 5 times, the electrical conductivity decreases and the sheet resistance does not go down sufficiently. Generally, the use of too much thermosetting resin hinders mutual contact of the graphite particles and the electrical conductivity decreases while the use of too little thermosetting resin does not yield a molded article of the specified strength. In consideration of these circumstances, the proportion of graphite particles is controlled in the aforementioned range. The lower limit of the proportion of the resin binder is equal to the amount required to give a molded article of the specified strength and the resin binder is normally mixed with 5 times its weight or more of the graphite particles, although the mix ratio varies with the kind of resin.

In addition to the graphite particles and the resin binder, additives such as curing accelerators, parting agents and electrically conductive fillers may be incorporated in the composition for a fuel cell separator of this invention within the range that does not ruin the effect of this invention. These additives are not calculated as resin binder or graphite particles.

The graphite particles and the resin binder may be mixed at the same time or two kinds of graphite differing in particle size distribution are mixed together in advance and then mixed with the resin binder, the latter method being preferable.

In the production of a fuel cell separator from a composition therefor, an advantageous procedure is as follows; the resin, a mixture of graphite particles differing either in kind or in average particle diameter in an amount 5–15 times that of the resin, the resin binder and, optionally, a curing agent and other additives are kneaded to give a homogeneous composition, the composition is ground to an average particle diameter of 20–50 /im and the particles are molded and cured.

In the kneading step, any of general-purpose kneading machines such as kneaders and rolls can be used, but the kneading operation is not limited to the use of these machines. Kneading is carried out in such a manner as to give as homogeneous a composition as possible of the resin and graphite particles. It is allowable to apply heat or add a low-boiling solvent for the purpose of lowering the viscosity of the resin during kneading and care should be exercised not to complete curing in this case.

The composition obtained by kneading is then ground. The composition thus obtained often becomes non-adhesive when cooled on account of a relatively low content of the resin and it can be ground by the use of a known grinder. Examples of grinders to be used here are pulverizers for shear grinding and disc mills for compression grinding. It is advantageous to carry out the grinding operation so that the average particle diameter becomes 50 μm or less, preferably 30 μm or less or 20–50 μm. The electrical resistivity does not fall sufficiently when the particle diameter is 50 μm or more while the cost of grinding increases when the particle diameter is reduced too much; it is therefore desirable to determine the particle diameter in consideration of the capacity of a grinder and the cost of grinding. Of the graphite particles of different average diameter in the composition, large particles get ground preferentially in the grinding step thereby generating a surface free of adhering resin and this is likely to produce the effect of lowering the electrical resistivity. Therefore, it is advantageous to grind preferentially large particles with an average diameter of 60–300 μm to particles with an average diameter of 50 μm or less while grinding as little as possible of small graphite particles with an average diameter of less than 50 μm. If the grinding operation is carried out to an extent more than is necessary, the resin becomes insufficient in amount to spread throughout the graphite particles and there is the possibility that the strength of a molded article deteriorates.

After grinding, the ground composition is molded by the use of a heating type molding machine equipped with a mold. Since the epoxy resin binder that is a thermosetting resin is molded and cured at the same time, it is advisable to carry out the molding operation by keeping the temperature at 100–135° C., preferably 150–200° C. The temperature is controlled at a level above the curing temperature and below the carbonization temperature of the thermosetting resin in use. The molding pressure set at a higher level would preferably lower the electric resistivity in planar direction and raise the bulk density; however, as higher pressure would incur higher capital cost, the pressure is suitably controlled at 20–1,000 kg/cm$^2$, preferably 100–500 kg/cm$^2$.

If the ground composition is formed into an article of the shape prescribed for a fuel cell separator and at the same time provided with the prescribed grooves in the course of molding, the article can be used for a fuel cell separator as it is or after simple processing. An alternative procedure is to mold into a plate and process the plate for addition of grooves and holes.

The fuel cell separator of this invention produced by the aforementioned process is dense and shows low gas permeability, high mechanical strength and good electrical conductivity.

The fuel cell separator produced by the process of this invention can be endowed with a bulk density of 1.90 g/cm$^3$ or more, preferably 1.95 g/cm$^3$ or more, and excellent gas impermeability and mechanical strength. When the bulk density is below 1.90 g/cm$^3$, not only the gas impermeability but also the mechanical strength deteriorate. The sheet resistance (areal pressure, 0.5 MPa) including sheets of carbon paper should be 40 m Ω $^2$ or less in order for the fuel cell to function properly as such, and this can be accomplished by the process of this invention. The sheet resistance can be reduced by using graphite of the kind showing high crystallinity or reducing the amount of the thermosetting resin in formulating the composition or it can be changed by the molding pressure and the like. The sheet resistance is determined by the procedure to be described later in the examples.

The fuel cell separator of this invention preferably shows a flexural strength of 30 MPa or more and/or a gas permeability of $1 \times 10^{-14}$ cm$^2$ or less.

When the flexural strength is 30 MPa or less, it is highly possible that the separator breaks down by vibration or impact. On the other hand, when the gas permeability exceeds $1 \times 10^{-14}$ cm$^2$, hydrogen and oxygen fed separately as fuel get mixed to deteriorate the power generating efficiency.

The fuel cell separator of this invention is dense, mechanically strong, highly electrically conductive and least anisotropic and gas permeable and a fuel cell in which the separator is incorporated exhibits high efficiency and long life.

PREFERRED EMBODIMENTS OF THE INVENTION

The methods for measuring the sheet resistance and gas permeability of the molded article (separator) are as follows.

Figure 1:
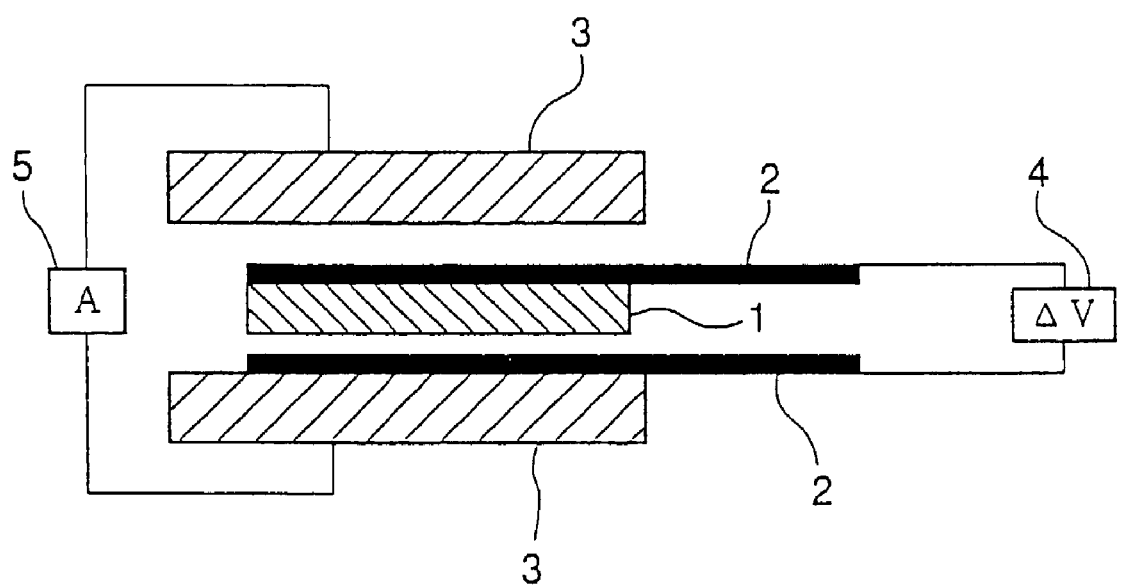
FIG. 1 is a schematic drawing to explain the method for measuring the sheet resistance.

(Sheet resistance (m Ωcm$^2$)) Referring to FIG. 1 schematically showing the method for measuring the sheet resistance, two sheets of carbon paper 2 are placed on the upper and lower sides of a specimen 1 (molded article) with a thickness of 3 mm, two copper sheets 3 are placed on the upper and lower sides of the sheets of carbon paper and an areal pressure of 0.5 MPa is applied in the vertical direction. The voltage between the two sheets of carbon paper 2 is read off a voltmeter 4 and at the same time the current flowing between the two copper sheets is read off a galvanometer 5 and the resistance (average) is calculated. The carbon paper used here is TGP-H-M Series 090M (thickness, 0.28 mm) and 120M (thickness, 0.38 mm) available from Toray Industries, Inc.

(Bulk density) Measured in accordance with the Archimedes method.

(Flexural strength) Measured in accordance with JIS K6911.

(Gas permeability) The gas permeability K (cm$^2$) was calculated in accordance with the Darcy's law. In actual measurement, a sample separator, 32 mm in diameter and 2 mm in thickness, was placed in an airtight vessel and pressurized to 10 kg/cm$^2$ by nitrogen, the flow rate of nitrogen gas passing through the separator was measured and the permeability was calculated as follows:

$$K(cm^2) = Q \cdot \mu \cdot 1 / \Delta P \cdot g_c \cdot A)$$

wherein Q is the flow rate (cm$^3$/sec), A is the area of the separator (cm$^2$), 1 is the thickness (cm), μ is the viscosity of the gas (g/cm·sec), ΔP is the pressure difference (g/cm$^2$) and $g_c$ is the gravitational conversion factor.

The following materials are used in the examples.

Graphite particles with an average diameter of 110 μm: isotropic synthetic graphite particles available from NSCC Techno-Carbon Co., Ltd.

Kish graphite particles with an average diameter of 10 μm: available from Kowa Seiko Co., Ltd.

Ortho-cresol novolak epoxy resin: EOCN-1020 available from Nippon Kayaku Co., Ltd., melting point 65° C., viscosity 0.3 Pa·s at 150° C.

Tetramethylbisphenol F type epoxy resin: YSLV-80XY available from Nippon Steel Chemical Co., Ltd., softening point 75–80° C., viscosity 0.008 Pa·s at 150° C.

Bisphenol F type epoxy resin: Epo Tohto YDF-170 available from Tohto Kasei Co., Ltd., viscosity 3 Pa·s at 25° C.

Bisphenol A type epoxy resin: Epo Tohto YD-017 available from Tohto Kasei Co., Ltd., softening point 117–127° C.

Liquid epoxy resin: Celloxide 2021A available from Daicel Chemical Industries, Ltd., melting point −20° C., viscosity 0.29 Pa·s at 25° C.

Liquid curing agent: Rikacid MH-700 available from Hitachi Chemical Co., Ltd.

Phenol novolak resin: Tamanol 758 available from Arakawa Chemical Industries, Ltd., softening point 83° C., viscosity 0.22–0.35 Pa·s at 150° C.

EXAMPLE 1

To 100 parts by weight of graphite particles prepared by mixing 50 parts by weight of the graphite particles with an average diameter of 110 μm and 50 parts by weight of the Kish graphite particles with an average diameter of 10 μm was added a resin binder composed of an epoxy resin and a curing agent in the amount shown in Table 1. The resin binder here is composed of 2 parts by weight of the ortho-cresol novolak epoxy resin as epoxy resin and 1 part by weight of the phenol novolak resin as curing agent. The resin binder shows a viscosity of 0.38 Pa·s at 150° C. Moreover, triphenylphosphine was added as curing accelerator in an amount 0.01 times that of the resin binder.

The composition was kneaded in a roll heated at 100° C. The kneaded composition was ground in a disc mill to the secondary particle diameter (average diameter) shown in Table 1. The ground composition was introduced to a mold, molded at 175° C. and 350 kg/cm$^2$ for 20 minutes, removed from the mold and submitted to measurement.

The results of measurement of the secondary particle diameter, bulk density and sheet resistance are shown in Table 1.

TABLE 1

| Graphite particles/binder weight ratio | Secondary particle diameter μm | Bulk density g/cm$^3$ | Sheet resistance mΩcm$^2$ |
|---|---|---|---|
| 5 | 30 | 1.96 | 45 |
| 6 | 30 | 1.96 | 25 |
| 7 | 30 | 1.97 | 20 |

EXAMPLE 2

A composition was prepared as in Example 1 except using the tetramethylbisphenol F type epoxy resin and mixing the graphite particles and the resin binder at the ratio shown in Table 2. The resin binder composed of the tetramethylbisphenol F type epoxy resin and the phenol novolak resin shows a viscosity of 0.036 Pa·s at 150° C. The composition was kneaded, ground, molded as in Example 1 to give a molded article.

The mix ratio of the graphite particles and the resin binder and the results of measurement of the secondary particle diameter, bulk density and sheet resistance are shown in Table 2.

TABLE 2

| Graphite particles/binder weight ratio | Median diameter after secondary grinding μm | Bulk density g/cm$^3$ | Sheet resistance mΩcm$^2$ |
|---|---|---|---|
| 8 | 29 | 1.96 | 16 |
| 9 | 30 | 1.98 | 15 |
| 10 | 38 | 1.95 | 12 |

EXAMPLE 3

To 100 parts by weight of graphite particles prepared by mixing 75 parts by weight of the graphite particles with an average diameter of 110 μm and 25 parts by weight of the Kish graphite particles with an average diameter of 10 μm was added a resin binder composed of an epoxy resin and a curing agent in the amount shown in Table 3. The resin binder here is composed of 2 parts by weight of the bisphenol F type epoxy resin and 1 part by weight of the phenol novolak resin as curing agent. The resin binder shows a viscosity of 0.022 Pa·s at 150° C. Moreover, triphenylphosphine was added as curing accelerator in an amount 0.01 times that of the resin binder.

The composition was kneaded in a roll heated at 100° C. The kneaded composition was ground in a disc mill to the secondary particle diameter (average diameter) shown in Table 3. The ground composition was introduced to a mold, molded at 175° C. and 350 kg/cm² for 20 minutes and removed from the mold.

The mix ratio of the graphite particles and the resin binder and the results of measurement of the properties are shown in Table 3.

TABLE 3

| Graphite particles/binder weight ratio | Median diameter after secondary grinding μm | Bulk density g/cm³ | Sheet resistance mΩcm² |
|---|---|---|---|
| 12 | 33 | 1.94 | 10 |
| 13 | 34 | 1.93 | 9 |
| 15 | 24 | 1.92 | 8 |

COMPARATIVE EXAMPLE 1

A composition was prepared as in Example 1 except using a 16:1 mixture by weight of the bisphenol A type epoxy resin and the phenol novolak resin as resin binder. The composition showed a too high viscosity and could not be kneaded with the graphite particles in a roll at 100° C. When kneaded in a roll above 100° C., the epoxy resin and the curing agent cured independently and could not be kneaded homogeneously.

COMPARATIVE EXAMPLE 2

A 2:1 mixture of the liquid epoxy resin and the liquid curing agent was used as resin binder. The binder showed a viscosity of 0.003 Pa·s at 150° C.

The resin binder was kneaded with the graphite particles in a roll as in Example 3. Since the binder was too low in viscosity, the resin was adsorbed in the gaps on the surface of the graphite particles and good kneading was not possible.

In the experiments conducted as in Example 1, resin binders differing in the combination of the epoxy resin and the curing agent were prepared and the relationship between the viscosity and the temperature was examined. A correlation was found between the viscosity at 150° C. and that at 25° C. (in the state of liquid) and a 10-fold to 20-fold rise in viscosity was often observed.

In each of the Examples, the gas permeability of the separator (molded article) obtained was $1 \times 10^{-14}$ cm² or less.

EXAMPLE 4

To 100 parts by weight of graphite particles prepared by mixing 50 parts by weight of the synthetic graphite particles with an average diameter of 110 μm and 50 parts by weight of the Kish graphite particles with an average diameter of 10 μm was added a resin binder composed of an epoxy resin and a curing agent in the amount shown in Table 4. In this example, 2 parts by weight of the tetramethylbisphenol F type epoxy resin as epoxy resin, 1 part by weight of the phenol novolak resin as curing agent and 0.03 part by weight of triphenylphosphine as curing accelerator were used.

The composition was kneaded in a roll heated at 100° C. The kneaded composition was ground finely in a grinder. The ground composition was introduced to a mold, molded at 175° C. and 350 kg/cm² for 20 minutes and removed from the mold. The properties of the molded articles are shown in Table 4.

TABLE 4

| Graphite particles/binder weight ratio | Bulk density g/cm³ | Sheet resistance mΩcm² | Flexural strength MPa | Gas permeability cm² |
|---|---|---|---|---|
| 3 | 1.86 | 100 | 65 | $5.76 \times 10^{-18}$ |
| 5 | 1.90 | 40 | 60 | $2.57 \times 10^{-17}$ |
| 9 | 1.98 | 15 | 44 | $7.76 \times 10^{-17}$ |

EXAMPLE 5

To 100 parts by weight of graphite particles prepared by mixing 75 parts by weight of the graphite particles with an average diameter of 110 μm and 25 parts by weight of the Kish graphite particles with an average diameter of 10 μm was added a resin binder composed of an epoxy resin and a curing agent in the amount shown in Table 5.

In this example, 2 parts by weight of the bisphenol F type epoxy resin as epoxy resin, 1 part by weight of the phenol novolak resin as curing agent and 0.03 part by weight of triphenylphosphine as curing accelerator were used.

The composition was kneaded in a roll heated at 100° C. and the kneaded composition was ground finely in a grinder. The ground composition was introduced to a mold, molded at 175° C., and 350 kg/cm² for 20 minutes and removed from the mold. The properties of the molded articles are shown in Table 5.

TABLE 5

| Graphite particles/binder weight ratio | Bulk density g/cm³ | Sheet resistance mΩcm² | Flexural strength MPa | Gas permeability cm² |
|---|---|---|---|---|
| 11 | 1.95 | 10 | 38 | $2.89 \times 10^{-16}$ |
| 15 | 1.92 | 8 | 30 | $5.40 \times 10^{-14}$ |
| 17 | 1.86 | 27 | 15 | $1.40 \times 10^{-12}$ |

EXAMPLE 6

To an epoxy resin binder composed of an epoxy resin and a curing agent was added a mixture of graphite particles prepared by mixing 50 parts by weight of the graphite particles with an average diameter of 110 μm and 50 parts by weight of the Kish graphite particles with an average diameter of 10 μm in the amount shown in Table 6.

In this example, 2 parts by weight of the tetramethylbisphenol F type epoxy resin as epoxy resin, 1 part by weight of the phenol novolak resin as curing agent and 0.03 part by weight of triphenylphosphine as curing accelerator were used.

The composition was kneaded in a roll heated at 100° C. and the kneaded composition was ground in a grinder. The ground composition was introduced to a mold, molded at 175° C. and 350 kg/cm² for 20 minutes and removed from the mold. The properties of the molded articles are shown in Table 6.

TABLE 6

| Graphite particles/binder weight ratio | Bulk density g/cm³ | Sheet resistance mΩcm | Flexural strength MPa | Gas permeability cm² |
|---|---|---|---|---|
| 3 | 1.86 | 100 | 65 | $5.76 \times 10^{-18}$ |
| 5 | 1.90 | 40 | 60 | $2.57 \times 10^{-17}$ |
| 9 | 1.98 | 15 | 44 | $7.76 \times 10^{-17}$ |

EXAMPLE 7

To an epoxy resin binder composed of an epoxy resin and a curing agent was added a mixture of graphite particles prepared by mixing 75 parts by weight of the graphite particles with an average diameter of 110 μm and 25 parts by weight of the Kish graphite particles with an average diameter of 10 μm in the amount shown in Table 7.

The composition was formulated as in Example 6 except using the bisphenol F type epoxy resin as epoxy resin and the composition was kneaded, ground, and molded as in Example 6. The results of measurement of the properties of the molded articles are shown in Table 7.

TABLE 7

| Graphite particles/binder weight ratio | Bulk density g/cm³ | Sheet resistance mΩcm | Flexural strength MPa | Gas permeability cm² |
|---|---|---|---|---|
| 11 | 1.95 | 10 | 38 | $2.89 \times 10^{-16}$ |
| 15 | 1.92 | 8 | 30 | $1.18 \times 10^{-15}$ |
| 17 | 1.86 | 27 | 15 | $5.76 \times 10^{-12}$ |

EXAMPLE 8

The experiment was carried out as in Example 6 while changing only the mix ratio of the graphite particles with an average diameter of 110 μm and the Kish graphite particles (recrystallized graphite particles) with an average diameter of 10 μm and the relationship between the mix ratio of graphite particles and the tap bulk density was investigated.

Figure 2:
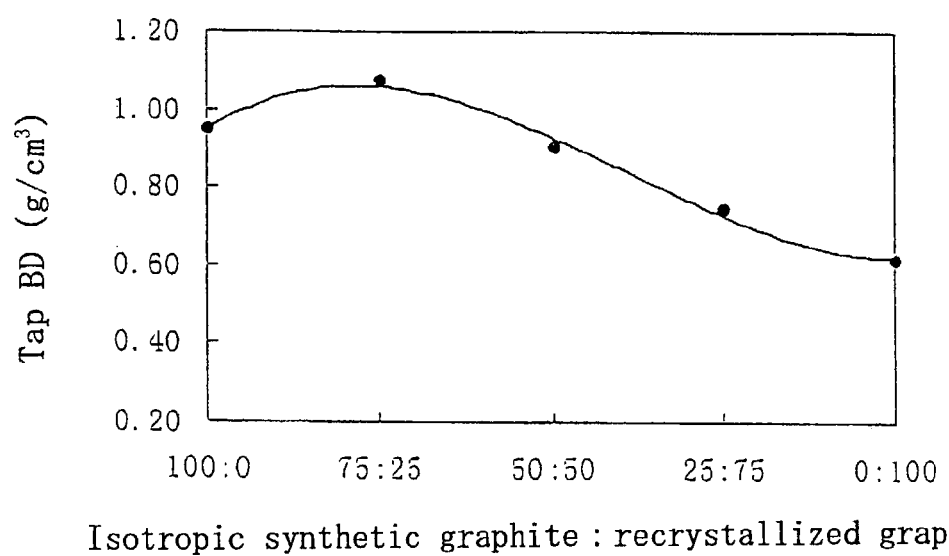
FIG. 2 is a graph illustrating the relationship between the mix ratio of graphite particles and the tap bulk density (tap BD).

The results are shown in FIG. 2. The tap bulk density is determined by placing 150 g of the sample in a 250-ml measuring cylinder, tapping the cylinder 900 times at the height of 30 mm and calculating the bulk density from the volume after the tapping.

EXAMPLE 9

The experiment was carried out as in Example 6 while changing only the mix ratio of the graphite particles (isotropic synthetic graphite particles) with an average diameter of 110 μm and the Kish graphite particles (recrystallized graphite particles) with an average diameter of 10 μm. The ratio by weight of the graphite particles to the resin binder is 9 in all experiments. The results are shown in Table 8.

TABLE 8

| Isotropic synthetic graphite particles: recrystallized graphite particles | Bulk density g/cm³ | Sheet resistance mΩcm | Flexural strength MPa | Gas permeability cm² |
|---|---|---|---|---|
| 100:0 | 1.89 | 23 | 28 | $4.14 \times 10^{-14}$ |
| 75:25 | 2.00 | 11 | 45 | $1.05 \times 10^{-16}$ |
| 50:50 | 1.98 | 15 | 44 | $7.76 \times 10^{-17}$ |
| 40:60 | 1.94 | 19 | 39 | $6.37 \times 10^{-16}$ |
| 25:75 | 1.87 | 38 | 14 | $5.33 \times 10^{-13}$ |

INDUSTRIAL APPLICABILITY

Electrically conductive molded resin articles with low electric resistivity can be obtained without a heat treatment such as calcination according to this invention and the process is effective for reducing the production cost. Moreover, the molded articles show excellent electrical conductivity, gas impermeability and strength and are valuable for fuel cell separators.

What is claimed is:

1. A composition for a fuel cell separator which is formulated from graphite particles and a liquid or solid resin binder with a viscosity of 0.01–0.5 Pa·s at 150° C. and a viscosity of 3 Pa·s or more at 25° C. at a weight ratio of (5–15):1, wherein the graphite particles comprise synthetic graphite particles with an average particle diameter of 50–300 μm and Kish graphite particles with an average particle diameter of less than 50 μm at a mix ratio by weight in the range from 40:60 to 90:10.

2. A composition for a fuel cell separator as described in claim 1 wherein the resin binder is an epoxy resin binder comprising an epoxy resin and a curing agent for the epoxy resin.

3. A composition for a fuel cell separator as described in claim 2 wherein the epoxy resin is represented by the following general formula (1)

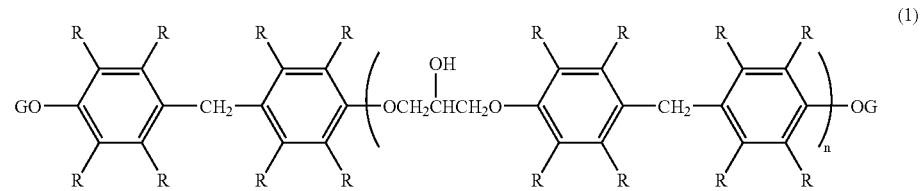

(wherein G is glycidyl or methyiglycidyl group, R is a hydrogen atom, a halogen atom or a hydrocarbon group containing 1–6 carbon atoms, either identical with or different from one another, and n is a number of 0–15).

4. A composition for a fuel cell separator as described in claim 3 wherein the epoxy resin represented by general formula (1) is a bisphenol F type epoxy resin, that is, the compound represented by general formula (1) wherein all R's are H and is either a liquid at 25° C. or a solid with a softening point or melting point of 30–100° C.

5. A composition for a fuel cell separator as described in claim 2 wherein the epoxy resin is represented by the following formula (2)

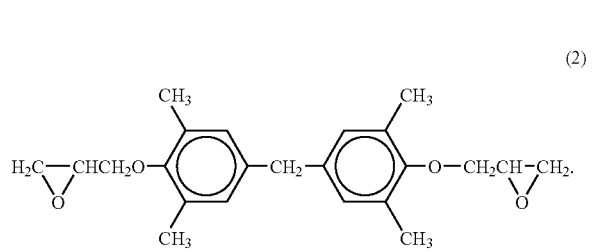

(2)

6. A fuel cell separator comprising the composition as described in claim 1 and showing a bulk density of 1.90 g/cm$^3$ or more and a sheet resistance including sheets of carbon paper (areal pressure, 0.5 MPa) of 40 m Ωcm$^2$ or less, wherein the composition is kneaded to homogeneity, ground, molded and cured.

7. A fuel cell separator as described in claim 6 wherein the flexural strength is 30 MPa or more and the gas permeability is 1×10$^{-14}$ cm$^2$ or less.

8. A composition for a fuel cell separator which is formulated from graphite particles and a liquid or solid resin binder with a viscosity of 0.01–0.5 Pa·s at 150° C. and a viscosity of 3 Pa·s or more at 25° C. at a weight ratio of (5–15): 1, wherein the graphite particles comprise isotropic graphite particles with an average particle diameter of 70–150 μm and anisotropic graphite particles with an average particle diameter of 5–20 μm at a mix ratio by weight in the range from 70:30 to 80:20.

9. A composition for a fuel cell separator as described in claim 8 wherein the resin binder is an epoxy resin binder comprising an epoxy resin and a curing agent for the epoxy resin.

10. A composition for a fuel cell separator as described in claim 9 wherein the epoxy resin is represented by the following general formula (1)

containing 1–6 carbon atoms, either identical with or different from one another, and n is a number of 0–15).

11. A composition for a fuel cell separator as described in claim 10 wherein the epoxy resin represented by general formula (1) is a bisphenol F type epoxy resin, that is, the compound represented by general formula (1) wherein all R's are H and is either a liquid at 25° C. or a solid with a softening point or melting point of 30–100° C.

12. A composition for a fuel cell separator as described in claim 9 wherein the epoxy resin is represented by the following formula (2)

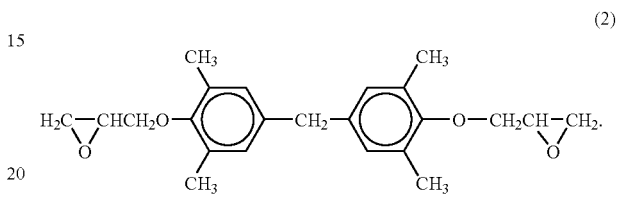

(2)

13. A fuel cell separator comprising the composition as described in claim 8 and showing a bulk density of 1.90 g/cm$^3$ or more and a sheet resistance including sheets of carbon paper (areal pressure, 0.5 MPa) of 40 m Ωcm$^2$ or less, wherein the composition is kneaded to homogeneity, ground, molded and cured.

14. A fuel cell separator as described in claim 13 wherein the flexural strength is 30 MPa or more and the gas permeability is 1×10$^{-14}$ cm$^2$ or less.

15. A process for producing a fuel cell separator which comprises kneading a composition formulated from graphite particles and a liquid or solid resin binder with a viscosity of 0.01–0.5 Pa·s at 150° C. and a viscosity of 3 Pa·s or more at 25° C. at a weight ratio of (5–15):1 into a homogeneous composition, grinding the homogeneous composition to an average particle diameter of less than 50 μm, molding the ground composition, and curing the molded composition, wherein the graphite particles comprises synthetic graphite particles with an average particle diameter of 50–300 μm and Kish graphite particles with an average particle diameter of less than 50 μm at a mix ratio by weight in the range from 40:60 to 90:10, and wherein the resin binder is an epoxy resin binder comprising an epoxy resin and a curing agent for the epoxy resin.

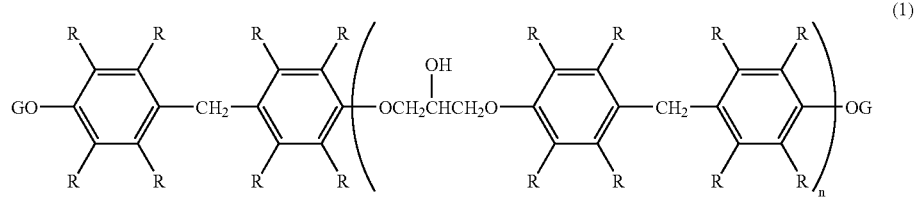

(1)

(wherein G is glycidyl or methyiglycidyl group, R is a hydrogen atom, a halogen atom or a hydrocarbon group

* * * * *